(12) United States Patent
Huang et al.

(10) Patent No.: US 8,139,191 B2
(45) Date of Patent: Mar. 20, 2012

(54) PIXEL ARRAY STRUCTURE

(75) Inventors: Kuei-Wei Huang, Taipei (TW); Chien-Kuo He, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 461 days.

(21) Appl. No.: 12/348,323

(22) Filed: Jan. 5, 2009

(65) Prior Publication Data

US 2010/0097555 A1  Apr. 22, 2010

(30) Foreign Application Priority Data

Oct. 16, 2008  (TW) .............................. 97139792 A

(51) Int. Cl.
*G02F 1/1343* (2006.01)
(52) U.S. Cl. ..................... 349/139; 349/144; 349/143
(58) Field of Classification Search ................. 349/144, 349/48, 139, 143, 129, 43, 141
See application file for complete search history.

(56) References Cited

U.S. PATENT DOCUMENTS 6,829,028 B2 * 12/2004 Lai et al. ...................... 349/130
7,034,789 B2    4/2006 Takeuchi et al.
7,649,604 B2 *  1/2010 Paik et al. ..................... 349/141
2007/0002194 A1  1/2007 Shin

FOREIGN PATENT DOCUMENTS

CN       101387803       3/2009

OTHER PUBLICATIONS

"First Office Action of China Counterpart Application", issued on Jul. 26, 2011, p. 1-p. 3, in which the listed reference was cited.

* cited by examiner

*Primary Examiner* — Thoi Duong
(74) *Attorney, Agent, or Firm* — Jianq Chyun IP Office

(57) ABSTRACT

A pixel array structure includes scan lines, data lines, first pixels, and second pixels. The scan lines and the data lines are intersected. The first and the second pixels are staggered. Each first pixel includes a first switching element, a first pixel electrode and a second pixel electrode electrically connected to the first switching element. Each second pixel includes a second switching element, a third pixel electrode and a fourth pixel electrode electrically connected to the second switching element. The first and the second switching elements electrically connect corresponding scan lines and data lines. A pattern of the first pixel electrode is symmetrical to a pattern of the fourth pixel electrode with respect to an extending direction of the scan lines. A pattern of the second pixel electrode is symmetrical to a pattern of the third pixel electrode with respect to the extending direction of the scan lines.

19 Claims, 6 Drawing Sheets

PIXEL ARRAY STRUCTURE

CROSS-REFERENCE TO RELATED APPLICATION

This application claims the priority benefit of Taiwan application serial no. 97139792, filed on Oct. 16, 2008. The entirety of the above-mentioned patent application is hereby incorporated by reference herein and made a part of specification.

BACKGROUND OF THE INVENTION

1. Field of the Invention

The present invention relates to a pixel array structure, and more particularly, to a pixel array structure in which different pixels are staggered.

2. Description of Related Art

Displays have drawn more attention day by day, and therefore various types of thin film transistor liquid crystal displays (TFT-LCDs) with superior display quality are developed in the market. For instance, in order to reduce color shift in a multi-domain vertical alignment liquid crystal display (MVA LCD), pixels that are designed to have two sub-pixel regions with different display voltages have been proposed.

FIG. 1 illustrates a conventional pixel array structure. Referring to FIG. 1, a pixel array structure 100 includes a plurality of scan lines 110, a plurality of data lines 120, and a plurality of pixels 130. The scan lines 110 and the data lines 120 are intersected, and each of the pixels 130 is electrically connected to the corresponding scan lines 110 and the corresponding data lines 120. Each of the pixels 130 includes a switching element 132, a first pixel electrode 134, and a second pixel electrode 136. The switching element 132 is electrically connected to one of the corresponding scan lines 110 and one of the corresponding data lines 120. Besides, a capacitor electrode 140 is disposed in each of the pixels 130. The capacitor electrode 140 is located below the first pixel electrode 134 and the second pixel electrode 136.

The first pixel electrode 134 and the second pixel electrode 136 are electrically connected to the switching element 132, respectively. Additionally, in the pixel array structure 100, different display voltages are represented at the first pixel electrode 134 and the second pixel electrode 136 by way of a coupling effect of the capacitor electrode 140. Hence, when the pixel array structure 100 is applied to an LCD, the color shift possibly occurring in the LCD can be compensated in an effective manner.

As the LCD performs a display function, signals with different polarities are inputted into each of the data lines 120 in the pixel array structure 100, so as to prevent liquid crystal molecules in the LCD from being inactivated due to receipt of signals with the same polarity for a long time. Nonetheless, the pixels 130 on different data lines 120 are interfered by the signals with different polarities, and thereby an issue of discordant brightness arises in the pixels 130 that are supposed to display images with consistent luminance.

SUMMARY OF THE INVENTION

The present invention is directed to a pixel array structure for compensating influence on different pixels due to different polarities of data lines.

In the present invention, a pixel array structure includes a plurality of scan lines, a plurality of data lines, a plurality of first pixels, and a plurality of second pixels. The scan lines are intersected with the data lines. The first pixels and the second pixels are staggered. Each of the first pixels includes a first switching element, a first pixel electrode, and a second pixel electrode. The first switching element is electrically connected to one of the scan lines and one of the data lines. The first pixel electrode and the second pixel electrode are electrically connected to the first switching element. Each of the second pixels includes a second switching element, a third pixel electrode, and a fourth pixel electrode. The second switching element is electrically connected to one of the scan lines and one of the data lines. The third pixel electrode and the fourth pixel electrode are electrically connected to the second switching element. A pattern of the first pixel electrode and a pattern of the fourth pixel electrode are mirror symmetrical to each other with respect to an extending direction of the scan lines, and a pattern of the second pixel electrode and a pattern of the third pixel electrode are mirror symmetrical to each other with respect to the extending direction of the scan lines.

In an embodiment of the present invention, the first pixels and the second pixels are staggered and arranged along the extending direction of the scan lines.

In an embodiment of the present invention, the first pixels and the second pixels are staggered and arranged along an extending direction of the data lines.

In an embodiment of the present invention, the first pixels and the second pixels are staggered and arranged along the extending direction of the scan lines, and the first pixels and the second pixels are staggered and arranged along an extending direction of the data lines.

In an embodiment of the present invention, each of the first pixels has a first pixel region and a second pixel region, and each of the second pixels has a third pixel region and a fourth pixel region.

In practice, the first pixel electrode has a first central pixel electrode pattern and a first peripheral pixel electrode pattern, for example. The first central pixel electrode pattern is located in the first pixel region, and the first peripheral pixel electrode pattern extends from the first central pixel electrode pattern to the second pixel region. The second pixel electrode has a second central pixel electrode pattern and a second peripheral pixel electrode pattern, for example. The second central pixel electrode pattern is located in the second pixel region, and the second peripheral pixel electrode pattern extends from the second central pixel electrode pattern to the first pixel region. The first peripheral pixel electrode pattern surrounds the second central pixel electrode pattern, and the second peripheral pixel electrode pattern surrounds the first central pixel electrode pattern.

Besides, the third pixel electrode can have a third central pixel electrode pattern and a third peripheral pixel electrode pattern. The third central pixel electrode pattern is located in the third pixel region, and the third peripheral pixel electrode pattern extends from the third central pixel electrode pattern to the fourth pixel region. The fourth pixel electrode has a fourth central pixel electrode pattern and a fourth peripheral pixel electrode pattern. The fourth central pixel electrode pattern is located in the fourth pixel region, and the fourth peripheral pixel electrode pattern extends from the fourth central pixel electrode pattern to the third pixel region. The third peripheral pixel electrode pattern surrounds the fourth central pixel electrode pattern, and the fourth peripheral pixel electrode pattern surrounds the third central pixel electrode pattern. Each of the first central pixel electrode patterns, each of the second central pixel electrode patterns, each of the third central pixel electrode patterns, and each of the fourth central pixel electrode patterns are respectively in a V shape, for example.

In addition, each of the first peripheral pixel electrode patterns includes a plurality of first block pixel electrode patterns and a plurality of first connecting pixel electrode patterns. One of the first connecting pixel electrode patterns is connected between the first central pixel electrode pattern and one of the first block pixel electrode patterns, and each of the other first connecting pixel electrode patterns is connected between every two of the first block pixel electrode patterns.

Certainly, each of the second peripheral pixel electrode patterns also includes a plurality of second block pixel electrode patterns and a plurality of second connecting pixel electrode patterns. One of the second connecting pixel electrode patterns is connected between the second central pixel electrode pattern and one of the second block pixel electrode patterns, and each of the other second connecting pixel electrode patterns is connected between every two of the second block pixel electrode patterns.

Moreover, each of the third peripheral pixel electrode patterns includes a plurality of third block pixel electrode patterns and a plurality of third connecting pixel electrode patterns. One of the third connecting pixel electrode patterns is connected between the third central pixel electrode pattern and one of the third block pixel electrode patterns, and each of the other third connecting pixel electrode patterns is connected between every two of the third block pixel electrode patterns.

Each of the fourth peripheral pixel electrode patterns includes a plurality of fourth block pixel electrode patterns and a plurality of fourth connecting pixel electrode patterns. One of the fourth connecting pixel electrode patterns is connected between the fourth central pixel electrode pattern and one of the fourth block pixel electrode patterns, and each of the other fourth connecting pixel electrode patterns is connected between every two the fourth block pixel electrode patterns.

In an embodiment of the present invention, a first slit is formed between the first pixel electrode and the second pixel electrode in each of the first pixels.

In an embodiment of the present invention, a second slit is formed between the third pixel electrode and the fourth pixel electrode in each of the second pixels.

In an embodiment of the present invention, the pixel array structure further includes a plurality of alignment protrusions disposed in the first pixels and the second pixels. The alignment protrusions are substantially in a V shape.

In an embodiment of the present invention, the first switching element and the second switching element are dual-drain thin film transistors (TFTs), respectively.

In an embodiment of the present invention, the first pixels further include a plurality of capacitor electrodes disposed below the first pixel electrodes and the second pixel electrodes.

In an embodiment of the present invention, the second pixels further include a plurality of capacitor electrodes disposed below the third pixel electrodes and the fourth pixel electrodes.

According to the present invention, pixels having different electrode patterns are staggered, and therefore interference of signals with different polarities on each of the pixels can be compensated. Namely, display uniformity of the pixel array structure can be improved by staggering different pixels. Accordingly, when the pixel array structure of the present invention is applied to an LCD, each of the pixels with different patterns of the pixel electrodes can be staggered, which is conducive to improvement of display quality of the LCD.

To make the above and other features and advantages of the present invention more comprehensible, several embodiments accompanied with figures are detailed as follows.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
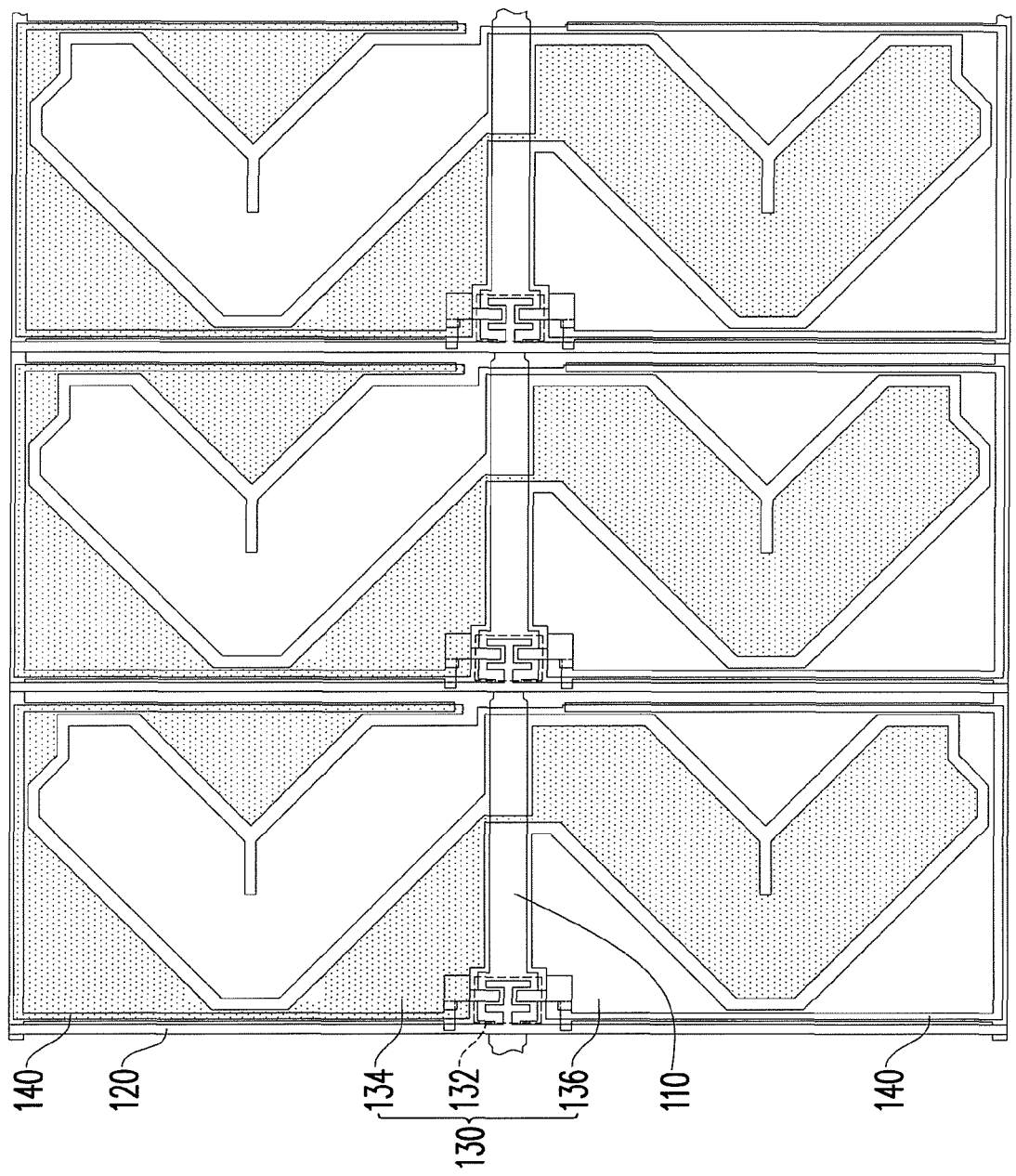
FIG. 1 illustrates a conventional pixel array structure.
Figure 2A:
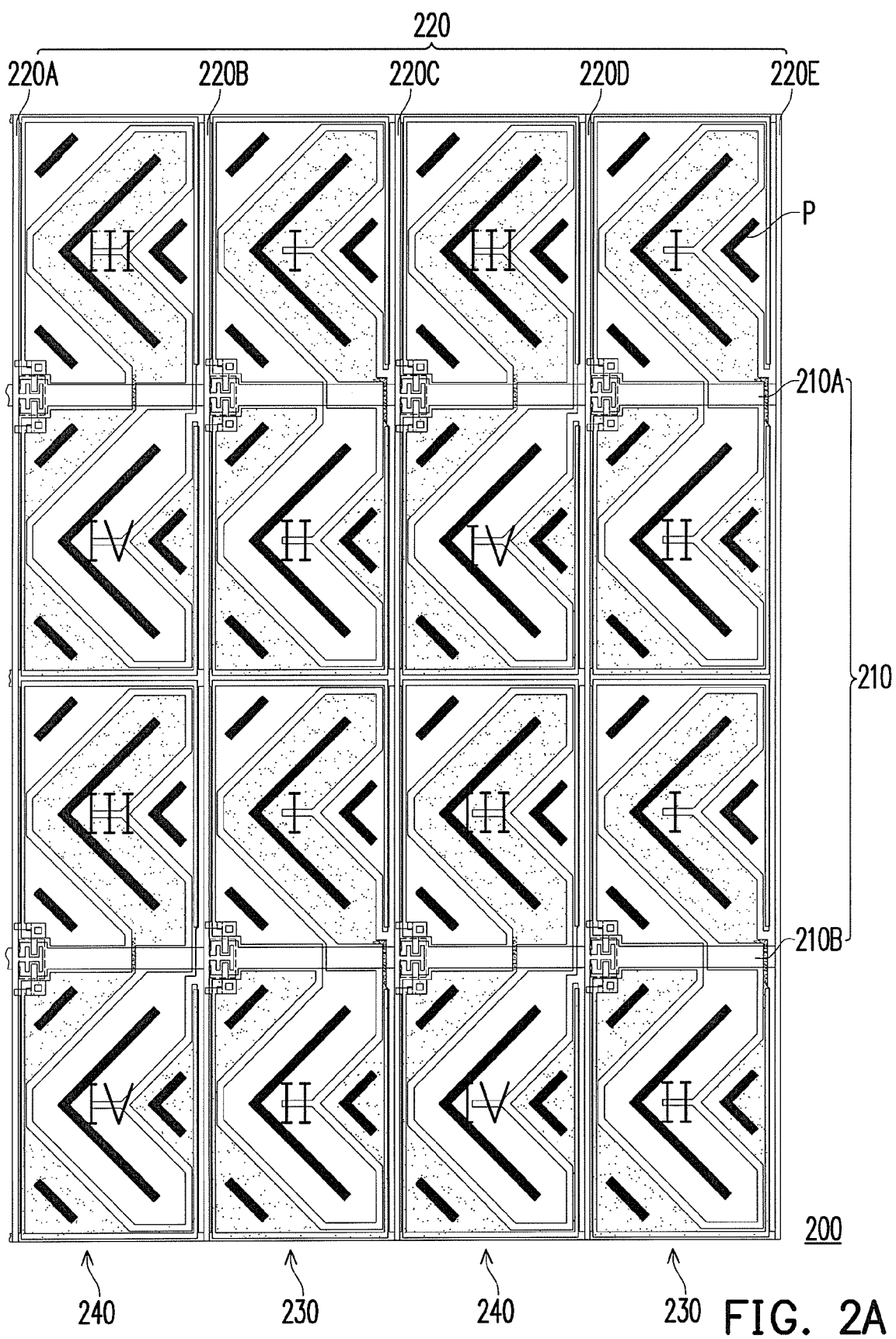
FIG. 2A illustrates a pixel array structure according to an embodiment of the present invention.

FIG. 2A illustrates a pixel array structure according to an embodiment of the present invention. Referring to FIG. 2A, a pixel array structure 200 includes a plurality of scan lines 210, a plurality of data lines 220, a plurality of first pixels 230, and a plurality of second pixels 240. The scan lines 210 are intersected with the data lines 220. The first pixels 230 and the second pixels 240 are staggered. Practically, in the present embodiment, the first pixels 230 and the second pixels 240 are staggered and arranged along an extending direction of the scan lines 210.

For instance, the pixel array structure 200 of the present embodiment is applied to an LCD in which color filtering units are distributed in a stripe-type manner. Here, the second pixels 240 electrically connected to data lines 220A and the first pixels 230 electrically connected to data lines 220D preferably present the same level of luminance, such that uniform images can be displayed. However, signals with different polarities are applied to the data lines 220A to 220E in a staggered manner. Hence, the second pixels 240 electrically connected to the data lines 220A are affected by the data lines 220B to which signals with another polarity are applied, such that a display voltage at the second pixels 240 is slightly changed. Likewise, the first pixels 230 electrically connected to the data lines 220D are affected by signals of the next data lines 220E, such that the display voltage at the first pixels 230 is different from an originally-inputted voltage.

In the present embodiment, the first pixels 230 and the second pixels 240 have different pixel electrode patterns. As such, even though the signals of different data lines 220 have different polarities, influence caused thereby on each of the pixels can be compensated. In practice, each of the first pixels 230 has a first pixel region I and a second pixel region II, and each of the second pixels 240 has a third pixel region III and a fourth pixel region IV, for example. According to the present embodiment, for instance, the scan lines 210 divide the first pixels 230 and the second pixels 240 into two regions, respectively. Certainly, it is possible and alternative for the scan lines 210 not to be disposed between the two pixel regions I and II or between the two pixel regions III and IV according to other embodiments.

In the present embodiment, the first pixels 230 and the second pixels 240 are symmetrical, for example. The scan lines 210 of the present embodiment are located in centers of the first pixels 230, and pixel electrode patterns of the first pixels 230 are symmetrical to pixel electrode patterns of the second pixels 240 with respect to the extending direction of the scan lines 210. That is to say, pixel electrode patterns in the first pixel region I and those in the fourth pixel region IV are symmetrical with respect to the extending direction of the scan lines 210, and pixel electrode patterns in the second pixel region II and those in the third pixel region III are symmetrical with respect to the extending direction of the scan lines 210. As such, even though the first pixels 230 and the second pixels 240 are influenced by the data lines 220 with different polarities, the influence can be compensated, such that images can be displayed at the same level of luminance. Namely, the values of the display voltages at the first pixels 230 and the second pixels 240 are approximately the same.

Figure 2B:
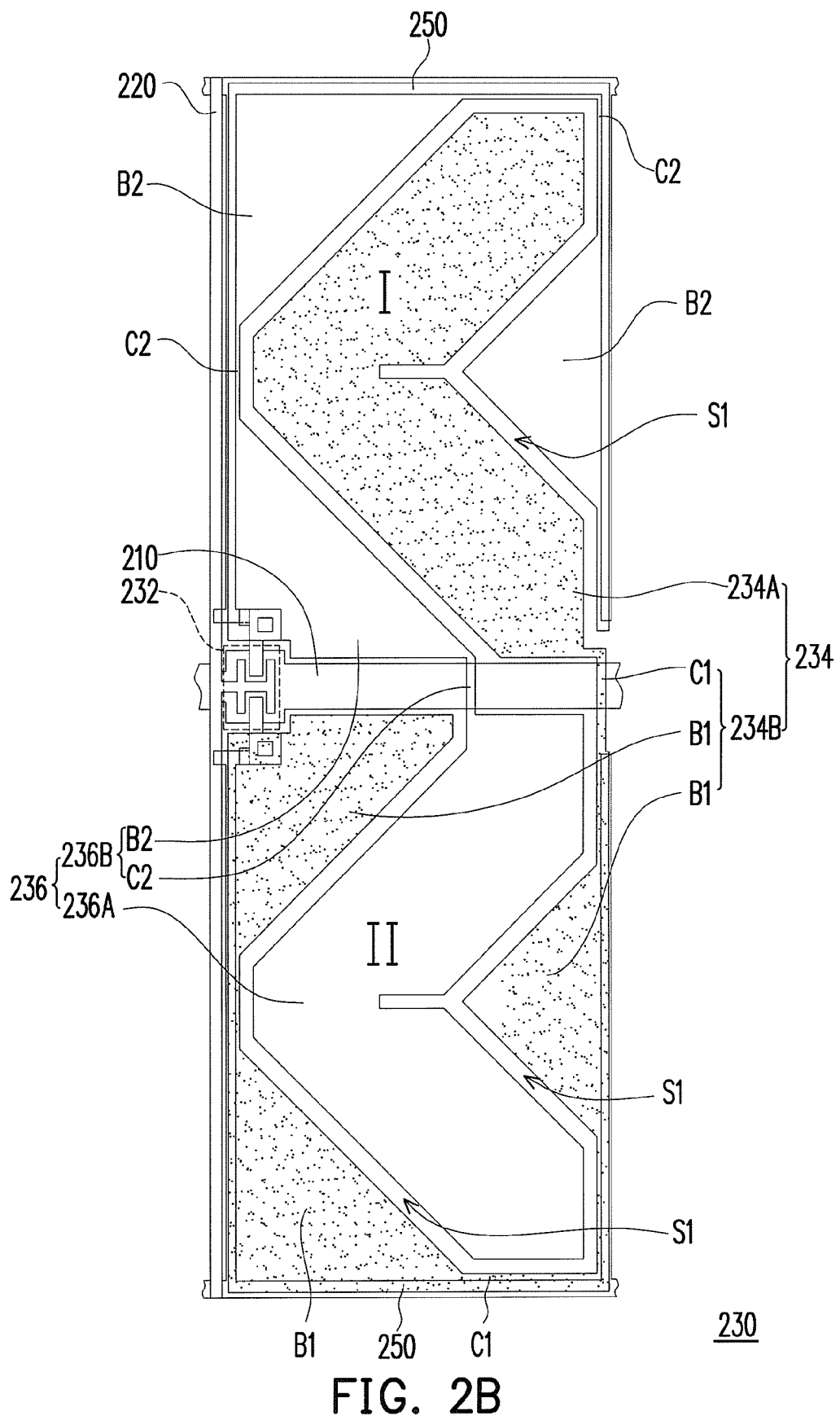
FIGS. 2B and 2C respectively illustrate first pixels and second pixels according to an embodiment of the present invention.
Figure 2C:
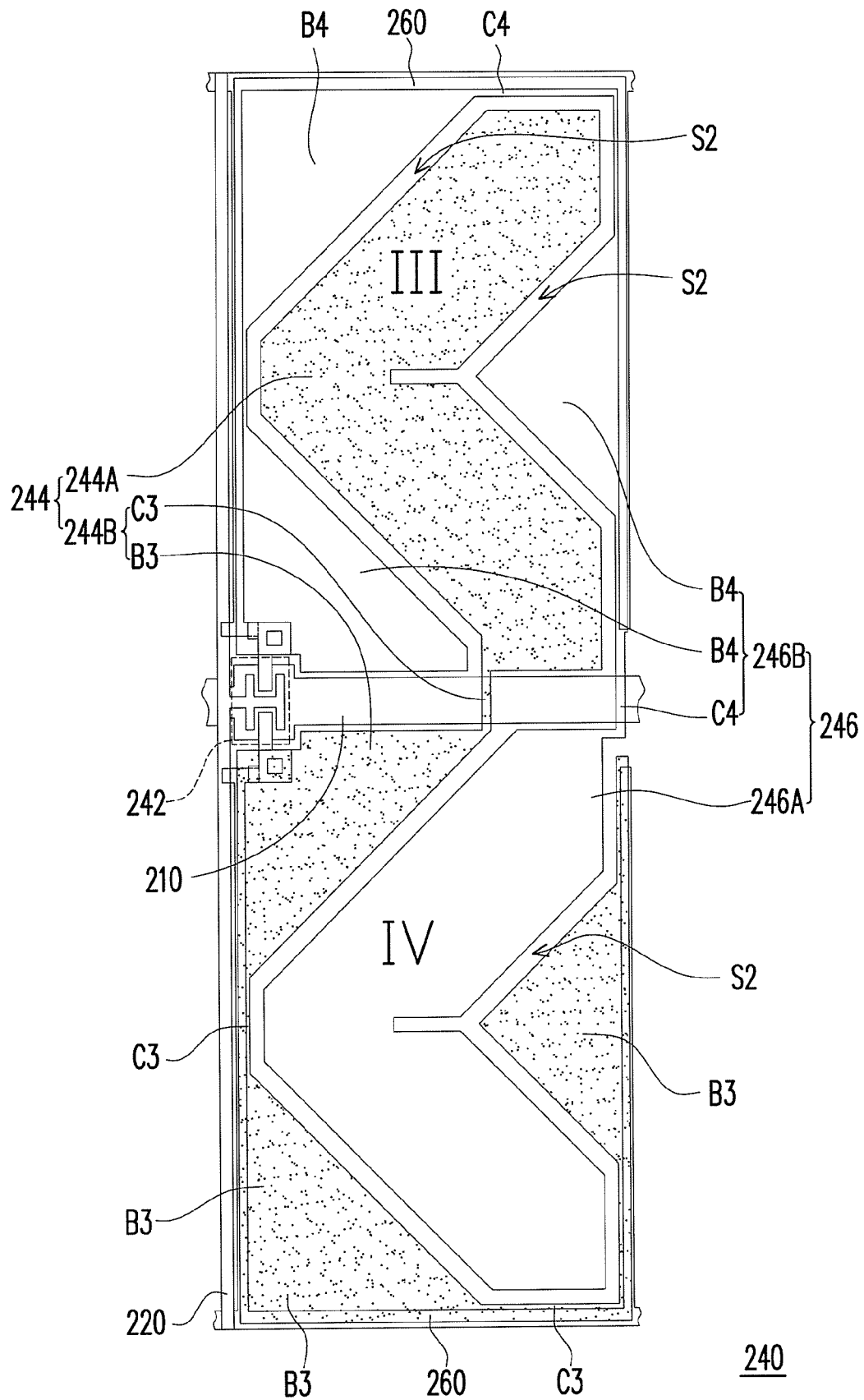

Specifically, please refer to FIGS. 2B and 2C respectively illustrating first pixels and second pixels according to an embodiment of the present invention. Referring to FIG. 2B, each of the first pixels 230 includes a first switching element 232, a first pixel electrode 234, and a second pixel electrode 236. The first switching element 232 is electrically connected to one of the scan lines 210 and one of the data lines 220. The first pixel electrode 234 and the second pixel electrode 236 are electrically connected to the first switching element 232. The first pixel electrode 234 has a first central pixel electrode pattern 234A and a first peripheral pixel electrode pattern 234B. The first central pixel electrode pattern 234A is located in the first pixel region I, and the first peripheral pixel electrode pattern 234B extends from the first central pixel electrode pattern 234A to the second pixel region II.

Besides, the second pixel electrode 236 has a second central pixel electrode pattern 236A and a second peripheral pixel electrode pattern 236B. The second central pixel electrode pattern 236A is located in the second pixel region II, and the second peripheral pixel electrode pattern 236B extends from the second central pixel electrode pattern 236A to the first pixel region I. Here, the first peripheral pixel electrode pattern 234B surrounds the second central pixel electrode pattern 236A, and the second peripheral pixel electrode pattern 236B surrounds the first central pixel electrode pattern 234A. The first pixels 230 further include a plurality of capacitor electrodes 250 disposed below the first pixel electrodes 234 and the second pixel electrodes 236.

In practice, when the first pixels 230 perform a display function, operation of the capacitor electrodes 250 is conducive to maintaining display voltages applied to the first pixel electrodes 234 and the second pixel electrodes 236. On the other hand, the operation of the capacitor electrodes 250 further allows the first pixel electrodes 234 and the second pixel electrodes 236 to have different display voltages, so as to resolve issues regarding color shift and insufficient color saturation in an LCD. In the present embodiment, the operation of the capacitor electrodes 250 permits images to be displayed with greater luminance in areas where the first pixel electrodes 234 are located and allows images to be displayed with darker luminance in areas where the second pixel electrodes 236 are located.

Moreover, each of the first peripheral pixel electrode patterns 234B includes a plurality of first block pixel electrode patterns B1 and a plurality of first connecting pixel electrode patterns C1. One of the first connecting pixel electrode patterns C1 is connected between the first central pixel electrode pattern 234A and one of the first block pixel electrode patterns B1, and each of the other first connecting pixel electrode patterns C1 is connected between every two of the first block pixel electrode patterns B1.

Certainly, each of the second peripheral pixel electrode patterns 236B also includes a plurality of second block pixel electrode patterns B2 and a plurality of second connecting pixel electrode patterns C2. One of the second connecting pixel electrode patterns C2 is connected between the second central pixel electrode pattern 236A and one of the second block pixel electrode patterns B2, and each of the other second connecting pixel electrode patterns C2 is connected between every two of the second block pixel electrode patterns B2.

Next, referring to FIG. 2C, each of the second pixels 240 includes a second switching element 242, a third pixel electrode 244, and a fourth pixel electrode 246. The second switching element 242 is electrically connected to one of the scan lines 210 and one of the data lines 220. The third pixel electrode 244 is electrically connected to the second switching element 242, and the third pixel electrode 244 has a third central pixel electrode pattern 244A and a third peripheral pixel electrode pattern 244B. The third central pixel electrode pattern 244A is located in the third pixel region III, and the third peripheral pixel electrode pattern 244B extends from the third central pixel electrode pattern 244A to the fourth pixel region IV.

The fourth pixel electrode 246 is electrically connected to the second switching element 244, and the fourth pixel electrode 246 has a fourth central pixel electrode pattern 246A and a fourth peripheral pixel electrode pattern 246B. The fourth central pixel electrode pattern 246A is located in the fourth pixel region IV, and the fourth peripheral pixel electrode pattern 246B extends from the fourth central pixel electrode pattern 246A to the third pixel region III. Here, the third peripheral pixel electrode pattern 244B surrounds the fourth central pixel electrode pattern 246A, and the fourth peripheral pixel electrode pattern 246B surrounds the third central pixel electrode pattern 244A.

The second pixels 240 further include a plurality of capacitor electrodes 260 disposed below the first pixel electrodes 244 and the second pixel electrodes 246. Operation of the capacitor electrodes 260 is similar to the operation of the aforesaid capacitor electrodes 250, which is conducive to maintaining display voltages applied to the third pixel electrodes 244 and the fourth pixel electrodes 246. On the other hand, the operation of the capacitor electrodes 260 further allows the third pixel electrodes 244 and the fourth pixel electrodes 246 to have different display voltages, so as to resolve issues regarding color shift and insufficient color saturation in an LCD. In the present embodiment, the operation of the capacitor electrodes 260 permits images to be displayed with greater luminance in areas where the third pixel electrodes 244 are located and allows images to be displayed with darker luminance in areas where the fourth pixel electrodes 246 are located, for example. It is certain that the capacitor electrodes 260 designed in different ways according to other embodiments can also allow images to be displayed with greater luminance in areas where the third pixel electrodes 244 are located and allow images to be displayed with darker luminance in areas where the fourth pixel electrodes 246 are located.

Practically, each of the third peripheral pixel electrode patterns 244B includes a plurality of third block pixel electrode patterns B3 and a plurality of third connecting pixel electrode patterns C3. One of the third connecting pixel electrode patterns C3 is connected between the third central pixel electrode pattern 244A and one of the third block pixel electrode patterns B3, and each of the other third connecting pixel electrode patterns C3 is connected between every two of the third block pixel electrode patterns B3. Each of the fourth peripheral pixel electrode patterns 246B includes a plurality of fourth block pixel electrode patterns B4 and a plurality of fourth connecting pixel electrode patterns C4. One of the fourth connecting pixel electrode patterns C4 is connected between the fourth central pixel electrode pattern 246A and one of the fourth block pixel electrode patterns B4, and each of the other fourth connecting pixel electrode patterns C4 is connected between every two of the fourth block pixel electrode patterns B4.

It can be learned from FIGS. 2B and 2C that each of the first central pixel electrode patterns 234A, each of the second central pixel electrode patterns 236A, each of the third central pixel electrode patterns 244A, and each of the fourth central pixel electrode patterns 246A are respectively in a V shape. Besides, a pattern of the first pixel electrode 234 and a pattern of the fourth pixel electrode 246 are mirror symmetrical to each other with respect to an extending direction of the scan lines 210, and a pattern of the second pixel electrode 236 and a pattern of the third pixel electrode 244 are mirror symmetrical to each other with respect to the extending direction of the scan lines 210. In other words, the patterns constituted by elements of the first pixels 230 and the patterns constituted by elements of the second pixels 240 are reverse with respect to the scan lines 210 as an axis. Therefore, when the first pixels 230 and the second pixels 240 are staggered, signal interference on different data lines 220 can be compensated by way of the design of the electrode patterns.

In particular, the first switching element 232 and the second switching element 242 are, for example, dual-drain TFTs, respectively. Besides, a first slit S1 is formed between the first pixel electrode 234 and the second pixel electrode 236 in each of the first pixels 230. Likewise, a second slit S2 is formed between the third pixel electrode 244 and the fourth pixel electrode 246 in each of the second pixels 240. Owing to the formation of the first slit S1 and the second slit S2, the first pixels 230 and the second pixels 240 are able to achieve wide-view-angle display effects. In the present embodiment, the first slit S1 and the second slit S2 are stripe-shaped slits, for example. By contrast, in other embodiments, the first slit S1 and the second slit S2 can have a feather shape or other shapes, which is not limited in the present invention.

Figure 3:
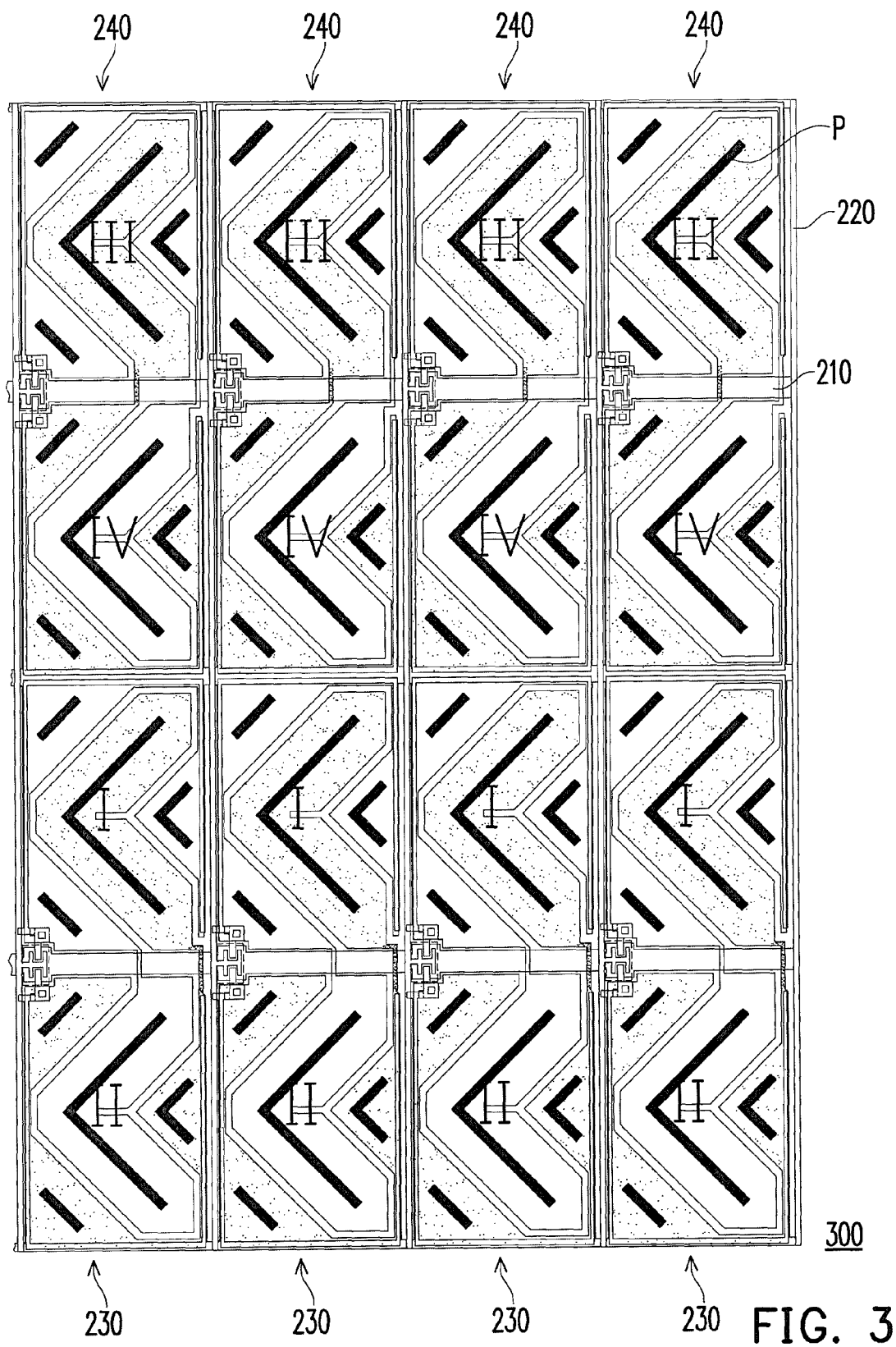
FIG. 3 illustrates a pixel array structure according to another embodiment of the present invention.
Figure 4:
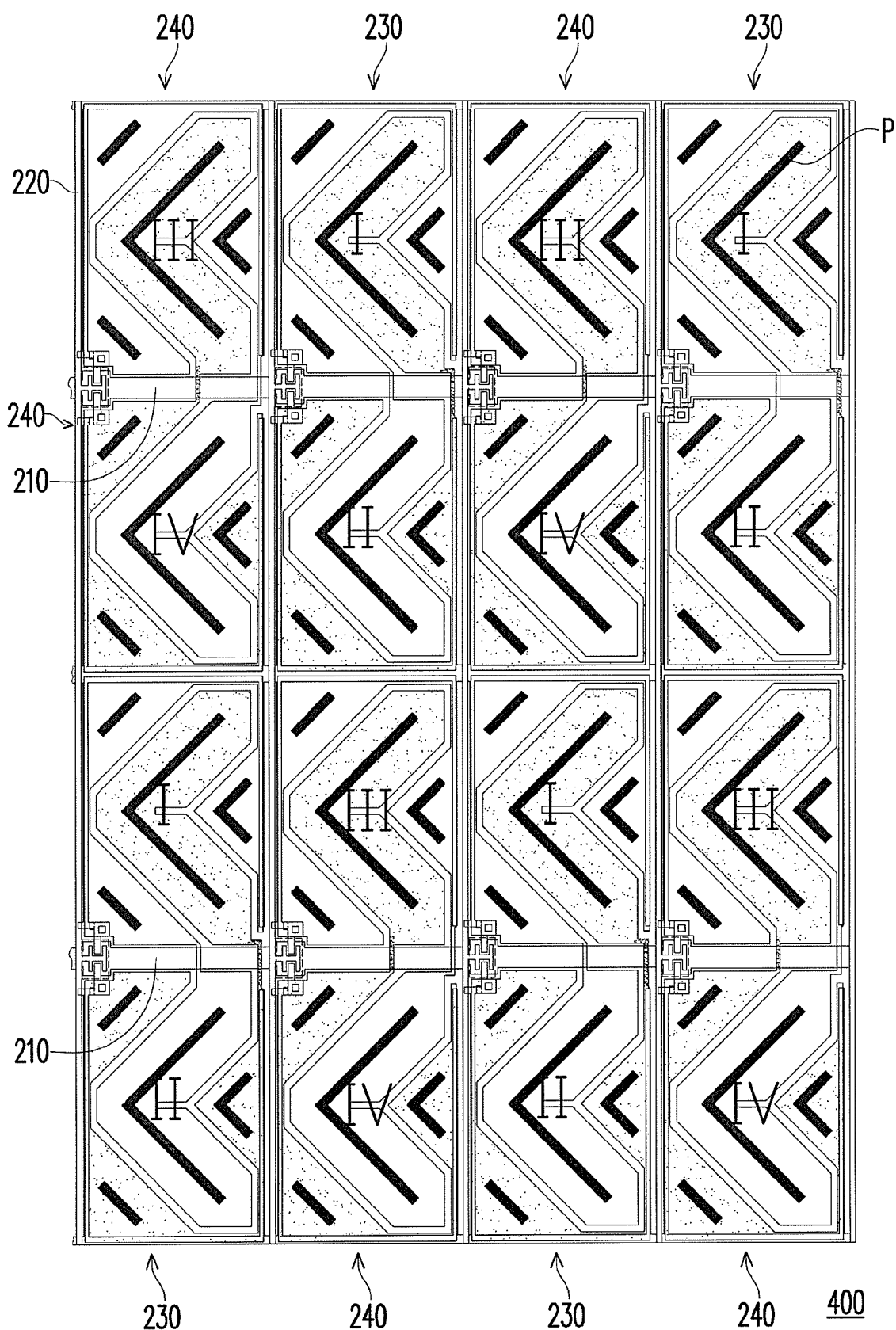
FIG. 4 illustrates a pixel array structure according to still another embodiment of the present invention.

Referring to FIGS. 2A, 3, and 4, to better the wide-view-angle display effect, a plurality of alignment protrusions P can be further disposed in the pixel array structure 200 according to the present embodiment. The alignment protrusions P can be disposed in the first pixels 230 and the second pixels 240. Besides, the alignment protrusions P can be in a V shape substantially and can be approximately parallel to the first slit S1 and the second slit S2.

Pixel electrode patterns of the first pixels 230 and the second pixels 240 are symmetrical. Hence, voltage variations of the first pixels 230 and the second pixels 240 can be compensated when the first pixels 230 and the second pixels 240 are affected by signals with another polarity. As such, when the pixel array structure 200 is physically applied to an LCD, the LCD is able to accomplish a favorable display effect. Specifically, uniform images can be displayed on the LCD in a wide-view-angle manner with reduced color shift.

In addition to the above embodiment, the first pixels 230 and the second pixels 240 in the present invention can also be arranged in other ways. FIG. 3 illustrates a pixel array structure according to another embodiment of the present invention. Referring to FIG. 3, in a pixel array structure 300, the first pixels 230 and the second pixels 240 as described in the previous embodiment are staggered and arranged along an extending direction of the data lines 220, for example. The staggered first and second pixels 230 and 240 are able to compensate interference of different signals on the data lines 220. That is to say, when the pixel array structure 300 is applied to an LCD, the LCD can achieve a better display effect.

Moreover, FIG. 4 illustrates a pixel array structure according to still another embodiment of the present invention. Referring to FIG. 4, the first pixels 230 and the second pixels 240 in a pixel array substrate 400 are staggered and arranged along both the extending direction of the scan lines 210 and the extending direction of the data lines 220. Namely, any two of the first pixels 230 are not adjacent to each other in both the extending direction of the scan lines 210 and the extending direction of the data lines 220. Likewise, any two of the second pixels 240 are not adjacent to each other in both the extending direction of the scan lines 210 and the extending direction of the data lines 220. The same pixels 230 or 240 are merely located at diagonal corners. As such, the influence that is posed on the pixels 230 or 240 and is caused by signals with different polarities on the data lines 220 can be compensated.

In light of the foregoing, the pixel electrode patterns of the two types of pixels are mirror symmetrical, and the two types of pixels are staggered. Thereby, the pixel array structure of the present invention is formed. When the signals transmitted by different data lines in the pixel array structure have different polarities, the first pixels and the second pixels having different pixel electrode patterns contribute to compensation due to the difference in the pixel electrode patterns. Accordingly, when the pixel array structure of the present invention is applied to an LCD, uniformity of images displayed on the LCD can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel array structure, comprising:
a plurality of scan lines;
a plurality of data lines, intersected with the scan lines; and
a plurality of first pixels, each of the first pixels comprising:
a first switching element, electrically connecting one of the scan lines and one of the data lines;
a first pixel electrode, electrically connecting the first switching element; and
a second pixel electrode, electrically connecting the first switching element; and
a plurality of second pixels, the first pixels and the second pixels being staggered, each of the second pixels comprising:
a second switching element, electrically connecting one of the scan lines and one of the data lines;
a third pixel electrode, electrically connecting the second switching element; and
a fourth pixel electrode, electrically connecting the second switching element, wherein a pattern of the fourth pixel electrode and a pattern of the first pixel electrode are mirror symmetrical to each other with respect to an extending direction of the scan lines, and a pattern of the second pixel electrode and a pattern of the third pixel electrode are mirror symmetrical to each other with respect to the extending direction of the scan lines, wherein
each of the first pixels has a first pixel region and a second pixel region, each of the second pixels has a third pixel region and a fourth pixel region, the first pixel electrode has a first central pixel electrode pattern and a first peripheral pixel electrode pattern, the first central pixel electrode pattern is located in the first pixel region, and the first peripheral pixel electrode pattern extends from the first central pixel electrode pattern to the second pixel region.

2. The pixel array structure as claimed in claim 1, wherein the first pixels and the second pixels are staggered and arranged along the extending direction of the scan lines.

3. The pixel array structure as claimed in claim 1, wherein the first pixels and the second pixels are staggered and arranged along an extending direction of the data lines.

4. The pixel array structure as claimed in claim 1, wherein the first pixels and the second pixels are staggered and arranged along the extending direction of the scan lines, and the first pixels and the second pixels are staggered and arranged along an extending direction of the data lines.

5. The pixel array structure as claimed in claim 1, wherein each of the first peripheral pixel electrode patterns comprises a plurality of first block pixel electrode patterns and a plurality of first connecting pixel electrode patterns, wherein one of the first connecting pixel electrode patterns is connected between the first central pixel electrode pattern and one of the first block pixel electrode patterns, and each of the other first connecting pixel electrode patterns is connected between every two of the first block pixel electrode patterns.

6. The pixel array structure as claimed in claim 1, wherein the second pixel electrode has a second central pixel electrode pattern and a second peripheral pixel electrode pattern, the second central pixel electrode pattern being located in the second pixel region, the second peripheral pixel electrode pattern extending from the second central pixel electrode pattern to the first pixel region, and wherein the first peripheral pixel electrode pattern surrounds the second central pixel electrode pattern, and the second peripheral pixel electrode pattern surrounds the first central pixel electrode pattern.

7. The pixel array structure as claimed in claim 6, wherein each of the second peripheral pixel electrode patterns comprises a plurality of second block pixel electrode patterns and a plurality of second connecting pixel electrode patterns, and wherein one of the second connecting pixel electrode patterns is connected between the second central pixel electrode pattern and one of the second block pixel electrode patterns, and each of the other second connecting pixel electrode patterns is connected between every two of the second block pixel electrode patterns.

8. The pixel array structure as claimed in claim 6, wherein the third pixel electrode has a third central pixel electrode pattern and a third peripheral pixel electrode pattern, the third central pixel electrode pattern is located in the third pixel region, and the third peripheral pixel electrode pattern extends from the third central pixel electrode pattern to the fourth pixel region.

9. The pixel array structure as claimed in claim 8, wherein each of the third peripheral pixel electrode patterns comprises a plurality of third block pixel electrode patterns and a plurality of third connecting pixel electrode patterns, and wherein one of the third connecting pixel electrode patterns is connected between the third central pixel electrode pattern and one of the third block pixel electrode patterns, and each of the other third connecting pixel electrode patterns is connected between every two of the third block pixel electrode patterns.

10. The pixel array structure as claimed in claim 8, wherein the fourth pixel electrode has a fourth central pixel electrode pattern and a fourth peripheral pixel electrode pattern, the fourth central pixel electrode pattern being located in the fourth pixel region, the fourth peripheral pixel electrode pattern extending from the fourth central pixel electrode pattern to the third pixel region, and wherein the third peripheral pixel electrode pattern surrounds the fourth central pixel electrode pattern, and the fourth peripheral pixel electrode pattern surrounds the third central pixel electrode pattern.

11. The pixel array structure as claimed in claim 10, wherein each of the fourth peripheral pixel electrode patterns comprises a plurality of fourth block pixel electrode patterns and a plurality of fourth connecting pixel electrode patterns, and wherein one of the fourth connecting pixel electrode patterns is connected between the fourth central pixel electrode pattern and one of the fourth block pixel electrode patterns, and each of the other fourth connecting pixel electrode patterns is connected between every two of the fourth block pixel electrode patterns.

12. The pixel array structure as claimed in claim 10, wherein each of the first central pixel electrode patterns, each of the second central pixel electrode patterns, each of the third central pixel electrode patterns, and each of the fourth central pixel electrode patterns are respectively in a V shape.

13. The pixel array structure as claimed in claim 1, wherein a first slit is formed between the first pixel electrode and the second pixel electrode in each of the first pixels.

14. The pixel array structure as claimed in claim 1, wherein a second slit is formed between the third pixel electrode and the fourth pixel electrode in each of the second pixels.

15. The pixel array structure as claimed in claim 1, further comprising a plurality of alignment protrusions disposed in the first pixels and the second pixels.

16. The pixel array structure as claimed in claim 15, wherein the alignment protrusions are substantially in a V shape.

17. The pixel array structure as claimed in claim 1, wherein the first switching element and the second switching element are dual-drain thin film transistors, respectively.

18. The pixel array structure as claimed in claim 1, wherein the first pixels further comprise a plurality of capacitor electrodes disposed below the first pixel electrodes and the second pixel electrodes.

19. The pixel array structure as claimed in claim 1, wherein the second pixels further comprise a plurality of capacitor electrodes disposed below the third pixel electrodes and the fourth pixel electrodes.

* * * * *